United States Patent Office.

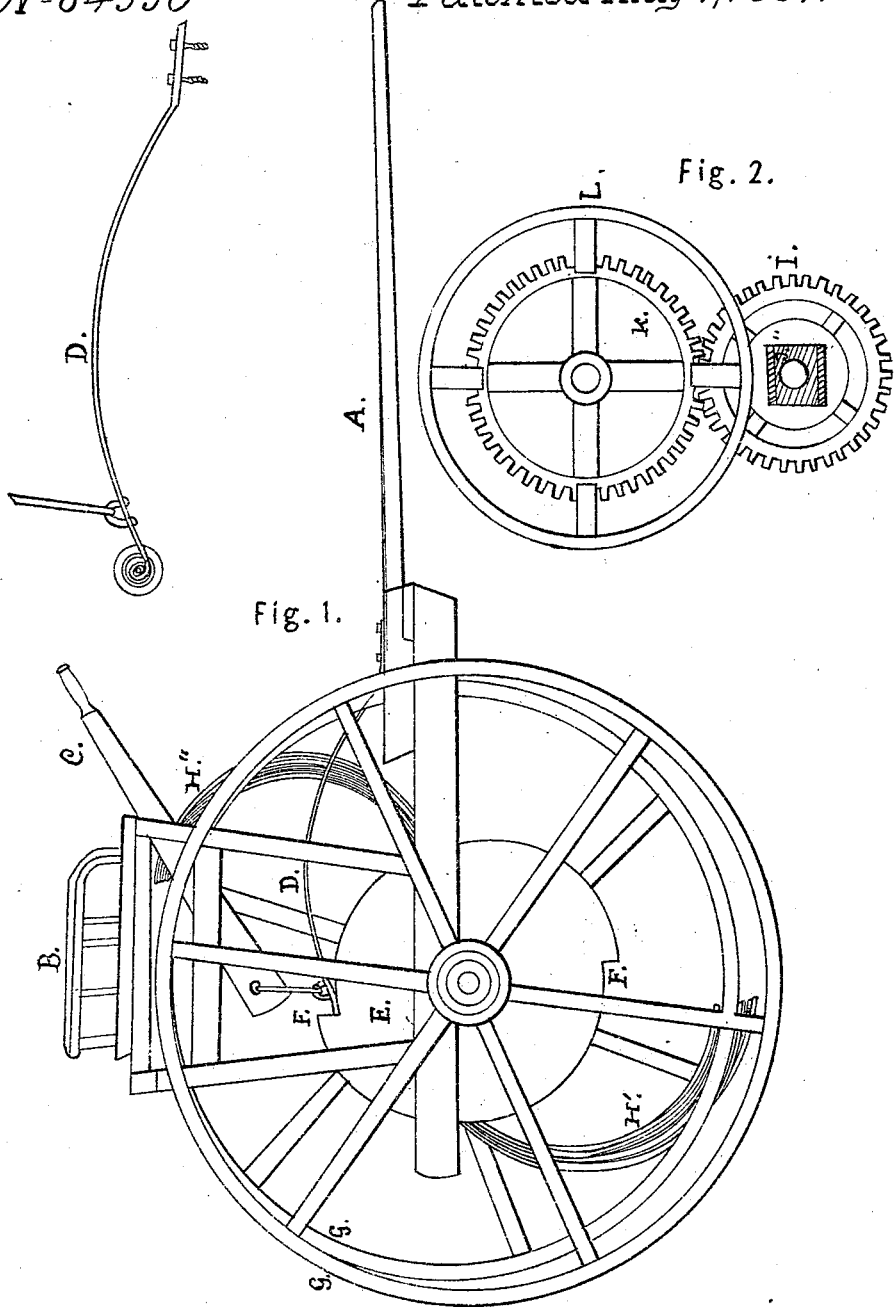

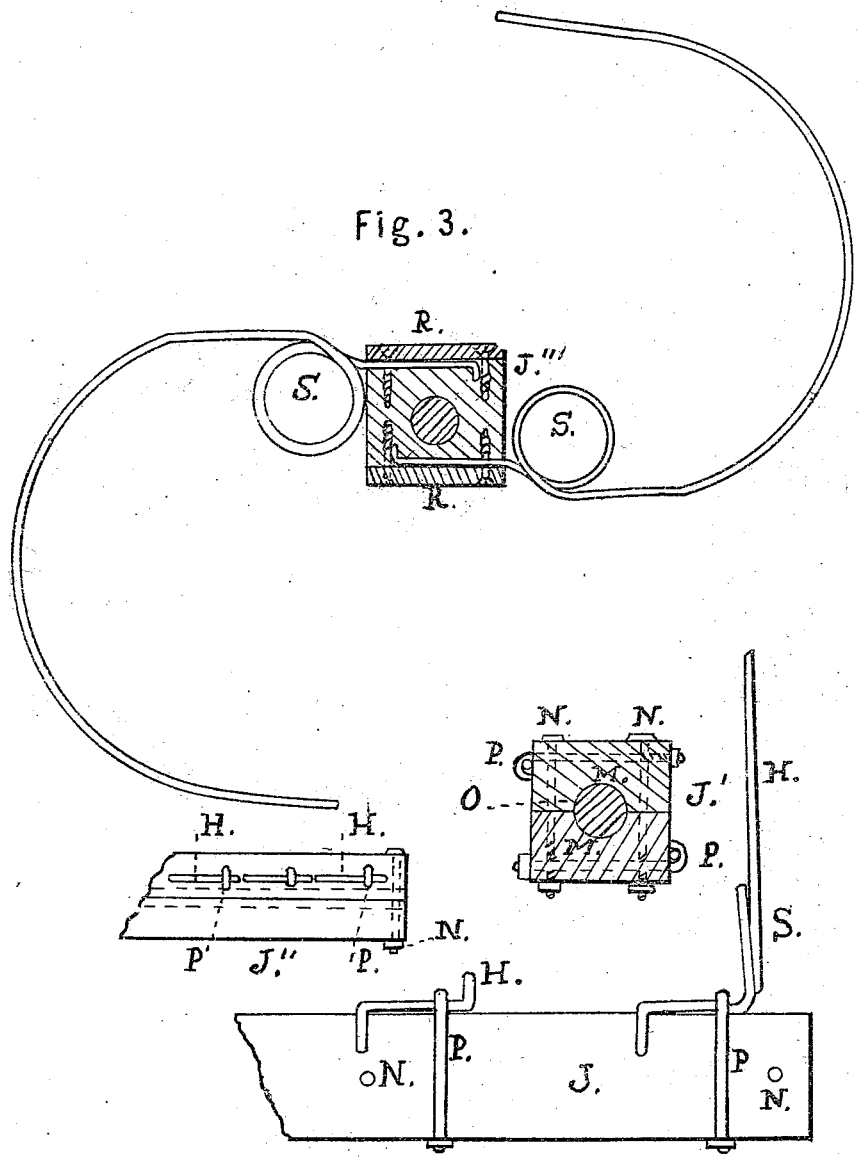

WILLIAM H. McPHERSON, OF DANBY, NEW YORK.

Letters Patent No. 64,550, dated May 7, 1867.

---

IMPROVEMENT IN HORSE-RAKES.

---

*The Schedule referred to in these Letters Patent and making part of the same.*

---

TO ALL WHOM IT MAY CONCERN:

Be it known that I, WILLIAM H. MCPHERSON, of Danby, Tompkins county, New York, have invented an improved Horse-Rake; and I do hereby declare that the following is a full and exact description thereof, reference being had to the annexed drawings, and to the letters of reference marked thereon.

My object is to make a simple revolving horse-rake on wheels. This I accomplish by using a rake-head which encloses the wheel axle; and to this head I attach two sets of teeth, so that while one set is raking the other set is in position to rake immediately after the first set is unloaded. To aid in and secure this I use a cam-wheel with stop spaces, and a stop-spring, and a lever, so made as to release at the proper moment the teeth, by the hand of the operator, and be self-acting in stopping the revolution of the rake. Thus I make my revolving rake by the use of these several conjoined parts, my purposes being simplicity, ease of operation, and efficient usefulness. Further, I use several ways of attaching the teeth to the rake-head. One is by a right-angled bending of the ends of the teeth, and securing the same in place by a plate of wood or metal. Another is by a right-angled bend near where the tooth first touches the rake-head, and by a second bend of the tooth for the purpose of holding the tooth fast to the rake-head. Either of these forms I use both covered and not covered by the plate just named, and further aided by bolts or staples in or through the head. Still further, as in many uses of a revolving rake, made as I have described, the revolutions may not be complete, or contingencies may occur when it is desirable to stop, regulate, retard, or hasten the revolution of the rake, I have attached to the head, about the axle, a cog-wheel, and geared into it another cog-wheel, for the purpose of controlling the said revolution of the teeth. This I do by means of a hand-rim attached to the last-named cog-wheel, so that by catching hold of this rim I stop, hasten, retard, or otherwise control the action of the teeth, and this in unison with my other devices, as described. This is seen in the drawings, where—

Figure 1 is a side elevation of my rake.

Figure 2 shows the side of my spring, and also the end view of my hand-motion wheels; and Figure 3 are parts showing the making of my rake-head and the modes of fastening the teeth to it.

In fig. 1, A indicates the thills, framework of the carriage, with axle and wheels, and B is the driver's seat; C, the spring-stop lever; D, the spring-stop acting at F on the cam-wheel E, and H' H'' the two sets of teeth. In fig. 2, D is the stop-spring, and at I is seen the cog-wheel about the rake-head J, and K is the other cog-wheel, which has the hand-rim L, as described. The upper figure in fig. 3 shows the right-angled bending of the teeth beneath the plate R. The two middle figures show the mode of joining the head about the axle and the double right-angled bending of the teeth, and the holding the same in place by the bolts P; and the lower right-hand figure of fig. 3 shows the same parts more clearly, J being the head, cut away so as to show the bolts P and P holding the teeth H' and H'' fast to the head. An equivalent to this would be to carry the end of the tooth through the head J, securing it by a nut or burr, and using a staple at P instead of a bolt.

The other uses and advantages of my rake are apparent to those skilled in the art to which it appertains.

*Claims.*

1. I claim the revolving tubular head J, provided with the teeth H' and H'', in combination with the cam-wheel E, spring-stop D, and lever C, substantially as and for the purposes described.

2. I claim the combination of the teeth H' H'', having a double right-angled bend at their upper ends, the bolts P, and head J, substantially as and for the purposes described.

3. I claim the use of the wheels I and K, acting on the head J, and moved by the hand-rim L, or its equivalent, for the purposes set forth.

WILLIAM H. McPHERSON.

Witnesses:
SAMUEL J. PARKER,
J. W. STANSBURY.